United States Patent

Chia-Hui

[11] Patent Number: 4,837,716
[45] Date of Patent: Jun. 6, 1989

[54] TWIN-RATE CHARGING AND DISCHARGING PROPORTIONAL TYPE CURSOR POSITION DETERMINING DEVICE

[76] Inventor: Lin Chia-Hui, Rm. 804, No. 149, Sec. 1, Keelung Rd, Taipei, Taiwan

[21] Appl. No.: 79,167

[22] Filed: Jul. 24, 1987

[51] Int. Cl.$^4$ ................ G08C 21/00; G06F 3/033
[52] U.S. Cl. ........................... 364/559; 178/19; 340/709; 364/518
[58] Field of Search ............ 178/18, 19; 340/709; 364/559, 523, 518–522

[56] References Cited

U.S. PATENT DOCUMENTS

| | | | |
|---|---|---|---|
| 4,658,373 | 4/1987 | Murakami et al. | 178/19 |
| 4,672,155 | 6/1987 | Naruse | 178/19 |
| 4,709,209 | 11/1987 | Murakami et al. | 178/18 |
| 4,728,944 | 3/1988 | Tamaru et al. | 178/18 |
| 4,733,023 | 3/1988 | Tamaru et al. | 178/18 |

Primary Examiner—Parshotam S. Lall
Assistant Examiner—Kevin J. Teska
Attorney, Agent, or Firm—Asian Pacific International Patent & Trademark Office

[57] ABSTRACT

An electromagnetic digitizer which applies twin rate charging and discharging proportional to determine center position of a cursor. It makes use of the largest and second largest voltages detected by sense rings, the second largest is charged for a standard time, and the largest one is discharged till zero potential, and then the discharge time is compared with sum of the standard time and discharge time, result of which is multiplied by a constant to get center position of the cursor.

5 Claims, 3 Drawing Sheets

TWIN-RATE CHARGING AND DISCHARGING PROPORTIONAL TYPE CURSOR POSITION DETERMINING DEVICE

BACKGROUND OF THE INVENTION

This invention relates to a digitizer for measuring the coordinates of a cursor.

Digitizers use various types of sensing devices, including electromagnetic induction, static electric induction, and untrasonic scanning; resolution varies from 25 m to 200 m, while precision varies from 0.05 mm to 0.2 mm, and sampling speed varies from 20 to 200 points per-second. Each kind of digitizer has its own specification. When precise reading and relatively high precision are required the electromagnetic type is recommended. Normally, the electromagnetic type digitizer uses a.c. of about 100 KHz to drive a cursor and to generate alternating magnetic fields in sense lines arranged in the form of lattices. Voltages developed in the sense lines are used to determine the center of the cursor.

Some electromagnetic type digitizers use phase differences to determine the center position of the cursor, phase of the signal on the right side of the cursor being opposite to that on the left side. Amplitude of a cursor position signal is sensed to develop a zero-crossing point; the zero-crossing point is used as a basis for determining the center position of the cursor.

SUMMARY OF THE INVENTION

The present invention relates to an electromagnetic digitizer, particularly a twin-rate charging and discharging proportional type device to determine the center position of a cursor. It makes use of the largest and second largest voltages detected by sense rings; the second largest is charged for a standard time, and the largest one is discharged till zero potential, and then the discharge time is compared with the sum of the standard time and discharge time, result of which is multiplied by a constant to obtain the center portion of the cursor.

DETAILED DESCRIPTION OF THE PREFERRED EMBODIMENT

The drawings show a precise reading type digitizer that solves the problem of reading error caused by uneven thickness of material or tolerance of assembly.

Structure, features and operation of the present invention are described below with reference to the attached drawings.

Figure 1:
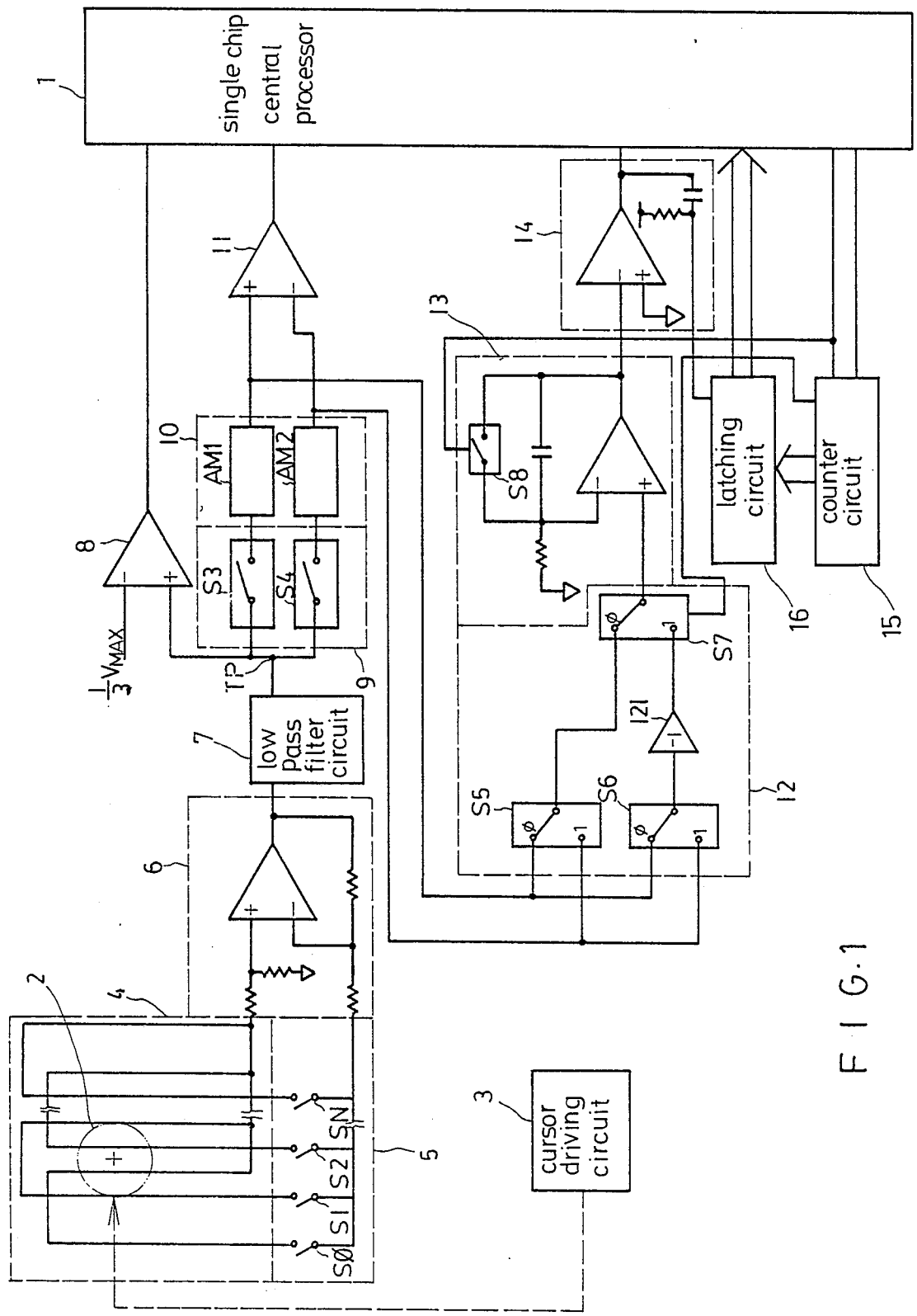
FIG. 1 is a circuit diagram for an apparatus constructed according to the present invention.

Please refer to FIG. 1 for a circuit diagram of the present invention, which comprises:
a single chip central processor unit (1);
a cursor (2);
a cursor driving circuit (3);
a sense ring circuit (4) composed of one or more sense ring, width of which is divided into 300 equal parts, and each of which is coincided with its two adjacent two rings;
a sense ring switching circuit (5) composed of a plural number of electronic switches, and controlled by the single chip central processor unit (1) to swith the sense ring circuit (4);
an amplifier circuit (6) to amplify voltage detected by the sense ring circuit (4);
a low pass filter circuit (7) to filter output from the amplifier circuit (6);
a first comparator circuit 1 (8) which compares output of the low pass filter circuit (7) with a standard voltage and then sends the result of its comparison to control processor unit (1);
an analog memory switching circuit (9) composed of one or more electronic switches and controlled by the single chip central processor unit (1);
an analog memory circuit (10) composed of one or more analog memories to store the output signals from the low pass filter circuit (7);
a second comparator circuit II (11) to compare output signals from the analog memory circuit (10) and then send the result of the comparison to the single chip central processor unit (1);
an integrating switch circuit (12) controlled by the single chip central processor unit (1) and a counter circuit (15); circuit 12 transmits out signals from the analog memory circuit (10) to an integrator circuit (13);
an integrator circuit (13) controlled by the single chip central processor unit (1) and the counter circuit (15) to integrate the output signal from the integrating switch circuit (12);
an integrating test circuit (14) to send a signal to the single chip central processor unit (1) and a latching circuit (16) as soon as the integrator circuit (13) completes integration;
a counter circuit (15) to receive pulse signals and controls signals from the signal chip central processor unit (1) and to supply signals to the integrating switch circuit (12) and the latching circuit (16); and
a latching circuit (16) controlled by the integrating test circuit (14) to send the output of the counter circuit (15) to the single chip central processor unit (1).

Figure 2:
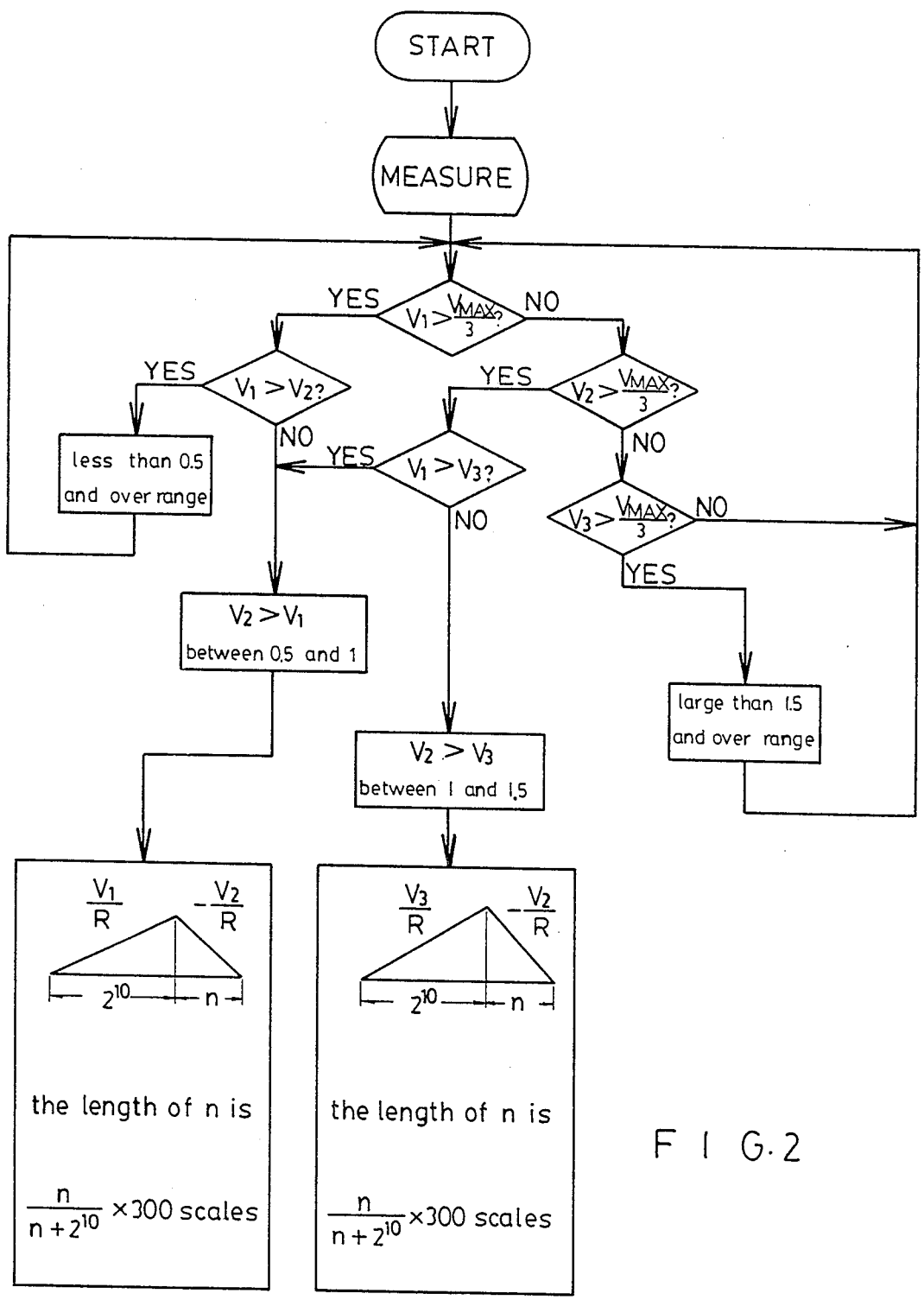
FIG. 2 is a flow chart for the FIG. 1 apparatus.
Figure 3:
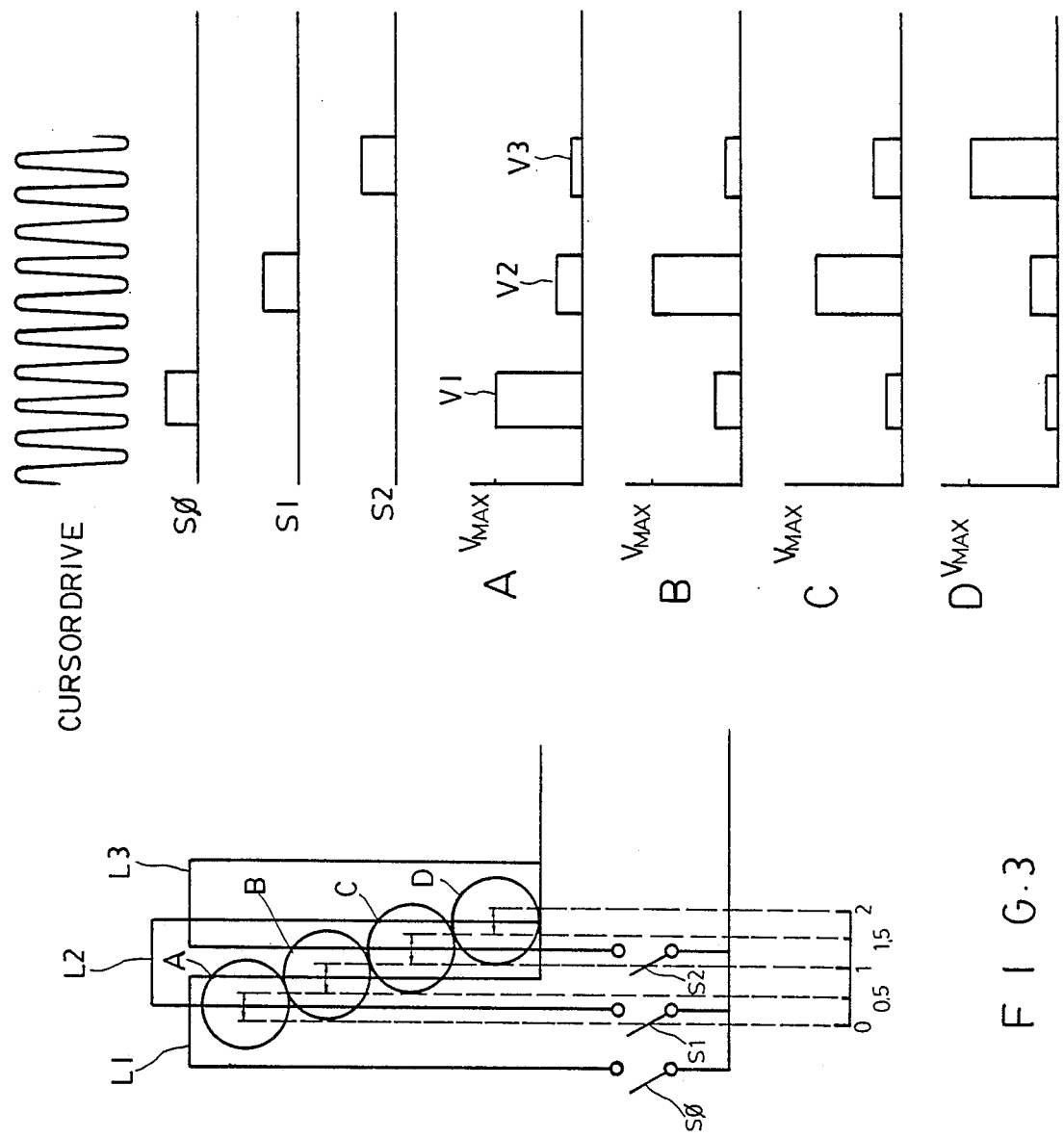
FIG. 3 illustrates circuiting and wave forms associated with the FIG. 1 apparatus.

Please refer to FIGS. 1, 2 and 3 which illustrate operation of the present invention with an embodiment having three sense rings L1, L2 and L3 to detect the voltages V1, V2 and V3 respetively.

(1) To determine the center position of the cursor (2), the cursor driving ciruit (3) supplies a.c. of the 100 KHz to the cursor (2), and, simultaneously, the single chip central processor unit (1) causes switch S to close so that L1 detects V/1 which reaches the point TP (FIG. 1) via the amplifier circuit (6) and the low pass filter circuit (7). If the comparator circuit I (8) judges that V1 is greater than $\frac{1}{3}$ Vmax, the single chip central processor unit (1) orders switch S3 to close so that V1 is stored in the analog memory AM1, and then orders switches S and S3 to open and switches S1 and S4 to close so that V2 detected by L2 is sent to the analog memory AM2 for the comparator circuit II (11) to compare which is greater, V1 or V2. If V1 is greater than V2, it means that the center position of the cursor (2) is less than the relative position 0.5 (FIG. 3) and beyond the measurement range of L2; therefore, remeasurement is required.

(2) After beginning to measure the center position of the (2), if it is found that V1 is greater than $\frac{1}{3}$ Vmax but V1 is smaller than V2, it means that the position of the cursor (2) is between the relative positions 0.5 and 1. Because switches S5 and S6 are controlled by the single chip central processor unit (1) for synchronous switching, the smaller signal store in AM1 and AM2 is picked up by switch S5, and the larger signal stored in AM1 and AM2 is picked up by switch S6. As V1 is smaller than V2, V1 is sent to the integrator circuit (13) via S6 and S7 for positive charging at a rate of V1/R, and time of charging is controlled by the counter circuit (15). When counting of the counter circuit (15) reaches 2, it orders S7 to switch to the "1" position so that V2 is sent via S6, flip flop (121) and S7 to the integrator circuit (1) for discharging at a rate of V2/R, and simultaneously, the counter circuit (15) begin counting from zero again. As soon as the integrator circuit (13) discharges to zero potential, the integrating test circuit (14) gives the single chip central processor unit (1) a signal "and of conversing", and the latching circuit (16) transmits a number which the counter circuit (15) counted to the single chip central processor unit (1). The center position of the cursor (2) is located at a point $n/(n+2^{10}) \times 300$ on the left side of the point "1" (because the width of the sense ring is divided into 300 equal parts).

(3) If, after beginning of the measurement, the single chip central processor unit (1) discovers that V1 is not greater than $\frac{1}{3}$ Vmax, the single chip central processor unit (1) orders switches S0 and S1 to open. Then, the comparator circuit I (8) judges, whether V2 is greater than $\frac{1}{3}$ Vmax or not. If V2 is greater than $\frac{1}{3}$ Vmax, the single chip central processor unit (1) closes switches S0 and S3 momentarily, and finally close switches S2 and S4 momentarily to store V3 in AM2. Then, it opens S2 and S4 momentary; the compartor circuit II (11) compares the magnitude of V1 and V3, and orders the single chip central processor unit (1) to abandon the smaller one of V1 and V3. If V1 is greater than V3, it means that the center position of the cursor (1) is between the relative position 0.5 and 1, and operation of the counter circuit (15) is identical to that described in paragraph (2). If V1 is smaller than V3, it means that the center position of the cursor (2) is between the relative positions 1 and 1.5, and at the same time, the integrator circuit (13) charges at a rate of V3/R and discharges at a rate of $-V2/R$. The number n counted by the counter circuit (5) substitutes n in the formula $n/(n+2^{10}) \times 300$, that is, the center position of the cursor (2) is on the right side of the relative position 1.

(4) If, after beginning of the measurement, neither V1, V2 nor V3 are found greater than $\frac{1}{3}$ Vmax, remeasurement is required.

(5) If, after beginning of the measurement, neither V1 nor V2 are greater than $\frac{1}{3}$ Vmax but V3 is greater than $\frac{1}{3}$ Vmax, it means that the center position of the cursor (2) is beyond the relative position 1.5 and remeasurement is required.

(6) Center position of the cursor (2) can be obtained by the aforesaid measurement procedure.

(7) If the above mentioned sense rings are for the X-axis, another set of sense rings can be added for the V-axis so that the Y-axis sense rings overlap the sense rings for the Y-axis at 90 degrees. Another sense ring switching circuit (5) and amplifier circuit (6) should be used with the circuits so that the single chip central processor unit can measure the position of the center position of the cursor on the Y-axis.

In conclusion, the present invention is creative in space arrangement, and provides significant improvement over the known prior art.

I claim:

1. A twin-rate charging and discharging proportional type cursor position determining device comprising
a central processor unit;
a cursor;
a cursor driving circuit;
a sense ring ciruit composed of a multiple spaced sense rings;
a sense ring switching circuit composed of multiple electronic switches, controlled by the central processor unit to switch the sense rings in the sense ring circuit;
an amplifier circuit connected to the sense ring circuit to amplify voltages detected by the sense rings;
a low pass filter circuit to filter output from the amplifer circuit;
a first comparator circuit which compares output of the low pass filter circuit with a standard voltage and then sends the result of its comparison to the central processor unit;
an analog memory switching circuit controlled by the central processor unit;
an analog memory circuit operable to store output signals from the low pass filter circuit;
a second comparator circuit which compares output signals from the analog memory circuit and then sends the result of the comparison to the central processor unit;
an integrating switch circuit controlled by the central processor unit;
a counter circuit receiving pulse signals and control signals from the single chip central processor unit;
an integrator circuit controlled by the counter circuit to integrate the output signal from the integrating switch circuit;
anintegrating test circuit operable to send a trigger signal to the central procesor unit when the integrator circuit completes integration; and
a latching circuit controlled by the integrating test circuit trigger signal to send the output of the counter circuit to the central processor unit;
wherein the central processor unit drives the sense ring switching circuit to causes voltages detected by the sense ring circuit to proceed via the amplifier circuit and the low pass filter circuit to the first comparator circuit for comparison with a standard voltage; and wherein if the voltage detected by the sense ring circuit is greater than the standard voltage, the central processor unit drives the analog memory switching circuit to save the largest voltage and second largest voltage in the analog memory circuit for comparison in the second comparator circuit; and wherein the central processor unit sequentially drives the integrating switch circuit to send the second largest voltage in the analog memory circuit to the integrator circuit for positive integration until the counter circuit counts to a preset value after which the largest voltage in the analog memory circuit is sent to the integrator circuit for negative integration, beginning at the initial value of voltage integrated and continuing until the integrator circuit reaches zero potential.

2. A structure as claimed in claim 1 wherein there are about 300 spaced sense rings in the sense ring circuit.

3. A structure as claimed in claim 1 wherein the standard voltage as used by the first comparator circuit is $\frac{1}{3}$ Vmax.

4. A structure as claimed in claim 1 wherein the count time for the counter circuit is a cycle of $2^{10}$ pulses.

5. A structure as claimed in claim 1 wherein the center position computing formula for the cursor is $n/(n+2^{10}) \times 300$ in which n is the value counted by the counter at negative inegration of the integrator circuit till zero potential.

* * * * *